(12) United States Patent
Chikami et al.

(10) Patent No.: US 7,172,336 B2
(45) Date of Patent: Feb. 6, 2007

(54) IN-LINE MIXING APPARATUS, PROCESS FOR MIXING REACTIVE CHEMICAL SOLUTIONS, AND PROCESS FOR PRODUCING MICROCAPSULES

(75) Inventors: Nozomu Chikami, Shizuoka-ken (JP); Kenichi Shinohara, Shizuoka-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 144 days.

(21) Appl. No.: 10/834,240

(22) Filed: Apr. 29, 2004

(65) Prior Publication Data
US 2004/0202043 A1  Oct. 14, 2004

Related U.S. Application Data

(62) Division of application No. 10/105,216, filed on Mar. 26, 2002, now Pat. No. 6,913,381.

(30) Foreign Application Priority Data
Mar. 28, 2001 (JP) ............................. 2001-092240
Mar. 28, 2001 (JP) ............................. 2001-092241

(51) Int. Cl.
*B01F 7/04* (2006.01)

(52) U.S. Cl. ............................. 366/171.1; 366/172.1; 366/172.2; 366/174.1; 366/181.4; 366/181.5; 366/331; 422/225

(58) Field of Classification Search ............ 366/171.1, 366/172.1, 172.2, 174.1, 177.1, 181.4, 181.5, 366/315, 316, 331, 340, 307; 422/225
See application file for complete search history.

(56) References Cited

U.S. PATENT DOCUMENTS 2,774,577 A * 12/1956 Anderson et al. .......... 366/290
2,798,698 A * 7/1957 Dooley .................... 366/171.1
2,960,318 A * 11/1960 Aillaud .................... 366/181.7
4,668,580 A   5/1987 Dahm et al.

(Continued)

FOREIGN PATENT DOCUMENTS

EP      0 535 384 A1   4/1993

(Continued)

OTHER PUBLICATIONS

Japanese Abstract No. 59166231, dated Sep. 19, 1984.

(Continued)

*Primary Examiner*—David Sorkin
(74) *Attorney, Agent, or Firm*—Sughrue Mion, PLLC

(57) ABSTRACT

An oil phase solution injected into a mixing flow path from an upstream injection inlet forms a flow from an upstream injection inlet to a discharge outlet, and a rotary blade is provided downstream of a mechanical seal. Thus, a reverse flow toward a mechanical seal of a polyvalent isocyanate and a polyol injected from an inlet downstream with respect to the mechanical seal tends not to take place. A separating film member is provided to prevent the chemical solutions flowing in the mixing flow path from coming into contact with a pressing means, which is for pressing a seal ring member of the mechanical seal against a rotation ring member. A reaction product is not adhered to the pressing means of the mechanical seal, which would decrease the pressing force, and leakage of the liquid from the mechanical seal can be effectively prevented.

7 Claims, 4 Drawing Sheets

U.S. PATENT DOCUMENTS

| | | | |
|---|---|---|---|
| 4,874,248 A * | 10/1989 | Luetzelschwab | 366/307 |
| 5,401,443 A | 3/1995 | Nagano et al. | |
| 5,665,796 A | 9/1997 | Hosokawa et al. | |
| 5,785,423 A | 7/1998 | Chikami | |
| 6,443,611 B1 | 9/2002 | Hasberg et al. | |
| 6,502,980 B1 * | 1/2003 | Ekstrom et al. | 366/305 |
| 6,913,381 B2 * | 7/2005 | Chikami et al. | 366/172.1 |

OTHER PUBLICATIONS

Japanese Abstract No. 56108529, dated Aug. 28, 1981.
Japanese Abstract No. 2000218153, dated Aug. 8, 2000.

* cited by examiner

IN-LINE MIXING APPARATUS, PROCESS FOR MIXING REACTIVE CHEMICAL SOLUTIONS, AND PROCESS FOR PRODUCING MICROCAPSULES

This is a divisional of application Ser. No. 10/105,216 filed Mar. 26, 2002, now U.S. Pat. No. 6,913,381; the disclosure of which is incorporated herein by reference.

BACKGROUND OF THE INVENTION

1. Field of the Invention

The present invention relates to an in-line mixing apparatus, a process for mixing reactive chemical solutions using the apparatus, and a process for producing microcapsules. More particularly, the present invention relates to an improvement of a technique of mixing raw material chemical solutions for a coating solution of pressure-sensitive duplicating paper utilizing microcapsules.

The invention also relates to an in-line mixing apparatus and a process for producing microcapsules, and more particularly, to an improvement of a technique of mixing reactive chemical solutions in an in-line mixing apparatus having a mechanical seal for sealing a rotation shaft of a rotary blade.

2. Description of the Related Art

In the production of pressure-sensitive paper, heat-sensitive paper, a photographic photosensitive material, cosmetics, a paint or the like by utilizing microcapsules, the following procedures are widely employed. A chemical solution containing a polyvalent isocyanate is added to an oil phase solution in which a solute which is to be a core substance of capsules is dissolved in advance, and these are mixed in an in-line mixing apparatus. A water phase solution is then added to the mixed chemical solution, and an oil-in-water emulsion is prepared by agitation. A suitable auxiliary additive, such as a polyvalent amine, is added to the emulsion, and the mixture is subjected to a suitable operation, such as heating, whereby microcapsules having a film, such as a film of polyurethane or polyurea, are prepared. The procedures are described, for example, in Japanese Patent Application Laid-Open (JP-A) No. 5-57178.

In this series of operations, an in-line mixing apparatus is used as the mixing apparatus for mixing the oil phase solution with the chemical solution such as a polyvalent isocyanate to achieve a high throughput in an in-line mixing process over a long period of time, as described in JP-A No. 5-57178. As the in-line mixing apparatus, an in-line mixer can be used, such as a high shearing mixer, a pipeline homo-mixer, a homo-mix line-flow or a fine flow mill.

In the case where a chemical solution of a polyvalent isocyanate and a polyol that reacts with the polyvalent isocyanate is continuously added to and continuously mixed with an oil phase solution that serves as a process fluid, an extremely hard reaction product having a blackish-brown color is formed in an agitation flow path of the in-line mixing apparatus. The reaction product thus formed adheres to and develops on a shaft seal or mechanical seal of a rotation shaft for supporting agitation blades provided in the agitation flow path. Consequently, the function of the shaft sealing portion or mechanical seal is deteriorated, causing such problems as leakage of the liquid from the shaft sealing portion or mechanical seal.

Furthermore, water, which is contained in the oil phase in trace amounts, reacts with the polyvalent isocyanate, and the resultant reaction product adheres to and develops on the shaft sealing portion or mechanical seal of the rotation shaft supporting agitation blades provided in the mixing flow path, so that the function of the shaft sealing portion or mechanical seal is deteriorated, causing such problems as leakage of the liquid from the shaft sealing portion or mechanical seal.

Particularly, in the case where the shaft sealing portion is a mechanical seal, when the reaction product is adhered on a pressing means for pressing a seal ring member to a rotation ring member, the pressing means cannot conform with vibrations caused by high speed rotation of the rotation ring member, and the pressing pressure of the seal ring member to the rotation ring member is decreased, causing leakage of the liquid.

Due to the problems described above, stable operation over a long period of time, which is an intrinsic advantage of continuous mixing by the in-line mixing apparatus, becomes difficult to carry out, and operation shutdown and disassembly for cleaning are necessary after an extremely short period of time. Thus, a considerable reduction in production efficiency is caused.

The invention has been developed under the above circumstances, and an object of the present invention is to provide an in-line mixing apparatus capable of carrying out stable continuous mixing over a long period of time even in the case where chemical solutions having reactivity are mixed, a process for mixing chemical solutions, and a process for producing microcapsules.

According to a first aspect of the invention, there is provided an in-line mixing apparatus for mixing a plurality of chemical solutions, the apparatus including: a mixing apparatus main body, including a plurality of injection inlets and at least one discharge outlet, the plurality of chemical solutions being injected at the injection inlets, the plurality of injection inlets including an upstream injection inlet and at least one downstream injection inlet which are separately disposed; a mixing flow path formed inside the mixing apparatus main body, which communicates with the plurality of injection inlets and the discharge outlet; a rotary blade disposed in the mixing flow path between a vicinity of the downstream injection inlet and the discharge outlet for mixing the plurality of chemical solutions injected at the injection inlets, the rotary blade including a rotation shaft; and at least one of a shaft sealing portion and a mechanical seal disposed at the rotation shaft of the rotary blade for sealing the rotation shaft, the at least one of a shaft sealing portion and a mechanical seal being disposed at a downstream side of the upstream injection inlet and being disposed at an upstream side of the downstream injection inlet, wherein a chemical solution injected at the upstream injection inlet forms a flow along the mixing flow path from the upstream injection inlet to the discharge outlet.

According to the invention, the chemical solution injected into the mixing flow path from the upstream inlet forms a flow from the upstream inlet to the discharge outlet on the mixing flow path, and the rotary blade provided at the downstream side of the shaft sealing portion or mechanical seal. The positional relationship of the flow and the rotary blade can make it difficult for the chemical solution injected into the mixing flow path from the downstream inlet, which is disposed at the downstream side of the shaft sealing portion or mechanical seal, to flow back toward the shaft sealing portion or mechanical seal even when turbulent flow occurs due to the rotation of the rotary blade. Therefore, when a reactive chemical solution is injected from the downstream inlet with respect to the shaft sealing portion or mechanical seal, even if a hard reaction product is formed by mixing of the chemical solutions, almost all of the reaction product does not reach the shaft sealing portion or mechanical seal but is discharged from the discharge outlet. Consequently, deterioration of the function of the shaft sealing portion or mechanical seal due to adhesion of the reaction product to the shaft sealing portion or mechanical seal is not liable to occur, and thus leakage of the liquid from the shaft sealing portion or mechanical seal can be effectively prevented. Thus, stable continuous mixing can be carried out over a long period of time even when chemical solutions having reactivity are mixed.

According to a second aspect of the invention, there is provided an in-line mixing apparatus according to the first aspect, further including a reverse flow preventing mechanism disposed in the mixing flow path between the at least one of a shaft sealing portion and a mechanical seal and the rotary blade, to surely prevent a back flow of the chemical solution injected into the mixing flow path from the downstream inlet toward the shaft sealing portion or mechanical seal.

According to a third aspect of the present invention, there is provided an in-line mixing apparatus according to the second aspect, wherein the reverse flow preventing mechanism includes a weir plate disposed to reduce cross-sectional area of the mixing flow path.

According to a fourth aspect of the present invention, there is provided an in-line mixing apparatus according to the third aspect, wherein the reverse flow preventing mechanism comprises a plurality of the weir plates, wherein the length of the weir plates becomes larger toward the downstream side of the mixing flow path, whereby a flow resistance of the chemical solution injected into the mixing flow path from the upstream inlet is made as low as possible, and thus the back flow of the chemical solution injected from the downstream inlet can be effectively prevented.

According to a fifth aspect of the present invention, there is provided an in-line mixing apparatus according to the fourth aspect, in which the number of the weir plates is from 2 to 10, which is preferable in light of the relationship between the back flow preventing effect and the flow resistance of the chemical solution injected from the upstream inlet.

According to another aspect of the present invention, there is provided an in-line mixing apparatus according to the first aspect, in which the at least one of a shaft sealing portion and a mechanical seal includes: a rotation ring member; a seal ring member; and pressing means for urging the sealing member toward the rotation ring member, and the apparatus further comprises liquid contact preventing means for substantially preventing the chemical solutions in the mixing flow path from coming into contact with the pressing means.

According to still another aspect of the present invention, there is provided an in-line mixing apparatus for mixing a plurality of chemical solutions, the apparatus including: a mixing apparatus main body, including at least one injection inlet, the plurality of chemical solutions being injected at the at least one injection inlet; a mixing flow path formed inside the mixing apparatus main body; a rotary blade disposed in the mixing flow path for mixing the plurality of chemical solutions injected at the at least one injection inlet, the rotary blade including a rotation shaft; a mechanical seal disposed at the rotation shaft of the rotary blade for sealing the rotation shaft, the mechanical seal including a rotation ring member, a seal ring member, and pressing means for urging the sealing member toward the rotation ring member; and liquid contact preventing means for substantially preventing the chemical solutions in the mixing flow path from coming into contact with the pressing means.

According to the invention, the liquid contact preventing means prevents the chemical solutions flowing in the mixing path from coming into contact with the pressing means for pressing the seal ring member of the mechanical seal against the rotation ring member and, whereby the chemical solutions flowing in the mixing path do not reach the pressing means. Consequently, even if chemical solutions having reactivity are mixed in the in-line mixing apparatus, no reaction product is formed that is adhered to the pressing means of the mechanical seal to reduce the pressing force, and thus leakage of the liquid from the mechanical seal can be effectively prevented. Therefore, stable continuous mixing over a long period of time can be carried out even when chemical solutions having reactivity are mixed.

According to still another aspect of the present invention, there is provided the above in-line mixing apparatus, constituted such that a gap, which communicates with the pressing means, is formed between a casing and the seal ring member, and the liquid contact preventing means includes a separating film member which faces the mixing flow path and separates the gap from the mixing flow path so as to prevent the chemical solutions flowing in the mixing flow path from coming into contact with the pressing means. According to this aspect, the pressing means can be physically separated from the agitation flow path, whereby a fundamental solution to the problems of the prior art can be achieved.

According to another aspect of the present invention, there is provided a process for mixing a plurality of chemical solutions, the process including: preparing one of the foregoing in-line mixing apparatuses; and supplying one of the chemical solutions to the downstream injection inlet, the one of the chemical solutions having reactivity with at least one other of the chemical solutions.

According to this aspect, in the case where the plurality of chemical solutions are mixed by using one of the foregoing in-line mixing apparatuses, the chemical solution having reactivity is injected into the mixing flow path from the downstream inlet disposed at the downstream side with respect to the shaft sealing portion or mechanical seal, whereby hardly any of a hard reaction product, if such is formed, reaches the shaft sealing portion or mechanical seal but is discharged from the discharge outlet. Therefore, the reaction product can be prevented from adhering to and growing on the shaft sealing portion or mechanical seal.

According to another aspect of the present invention, there is provided a process for mixing a plurality of chemical solutions including a polyvalent isocyanate and a polyol, the polyvalent isocyanate and polyol being mutually reactive, the process including: preparing one of the foregoing in-line mixing apparatuses; and supplying the polyvalent isocyanate and the polyol to the at least one downstream injection, disposed at a downstream side of the shaft sealing portion or mechanical seal.

According to the aspect, even when an extremely hard reaction product of blackish brown color is formed through a reaction between the polyvalent isocyanate and the polyol, most of a hard reaction product does not reach the shaft sealing portion or mechanical seal but is discharged from the discharge outlet. Therefore, the reaction product can be prevented from adhering to and growing on the shaft sealing portion or mechanical seal.

According to still another aspect of the present invention, there is provided a process for producing microcapsules, the process including: dissolving a solute, which is to be a core material of the microcapsules, in an oil phase solution; mixing the oil phase solution with a polyvalent isocyanate and a polyol in one of the foregoing in-line mixing apparatuses, to form a mixed chemical solution; emulsifying the mixed chemical solution in a water phase solution that includes an emulsifier to form an emulsion; and allowing a polyvalent amine to react with the emulsion to form microcapsules.

According to another aspect of the present invention, there is provided a process for producing microcapsules, the process including the steps of: dissolving a solute, which is to be a core material of the microcapsules, in an oil phase solution; supplying the oil phase solution to an in-line mixing apparatus, which includes sealing means for sealing a rotation shaft of a rotary blade therein, such that the oil phase solution flows along a mixing flow path; supplying a polyvalent isocyanate and a polyol to the in-line mixing apparatus such that the polyvalent isocyanate and the polyol flow the mixing flow path without reaching the sealing means; mixing the oil phase solution, and the polyvalent isocyanate and the polyol to form a mixed chemical solution; emulsifying the mixed chemical solution in a water phase solution which contains an emulsifier to form a emulsion; and allowing a polyvalent amine to react with the emulsion to form the microcapsules.

According to the present invention, when a polyvalent isocyanate and a polyol are mixed in an oil phase solution for production of microcapsules used, for example, in pressure-sensitive paper, heat-sensitive paper, a photographic photosensitive material, cosmetics a paint or the like, stable continuous mixing over a long period of time can be carried out by the use of an in-line mixing apparatus according to the present invention.

DESCRIPTION OF THE PREFERRED EMBODIMENTS

Preferred embodiments of an in-line mixing apparatus, a process for mixing reactive chemical solutions and a process for producing microcapsules according to the present invention will be described in detail with reference to the drawings.

Figure 1:
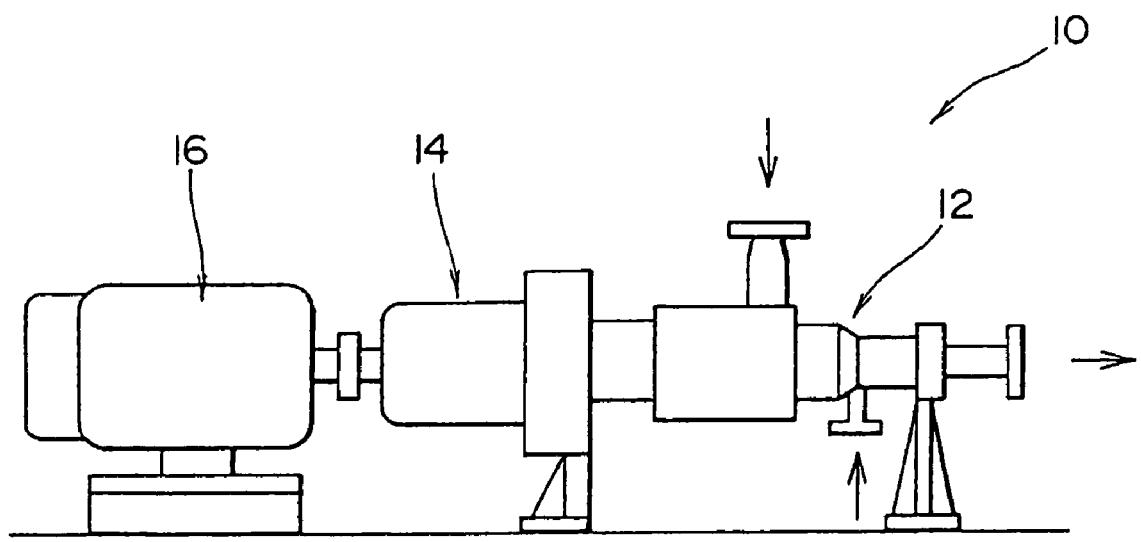
FIG. 1 is an external view showing an embodiment of an in-line mixing apparatus according to the present invention.
Figure 2:
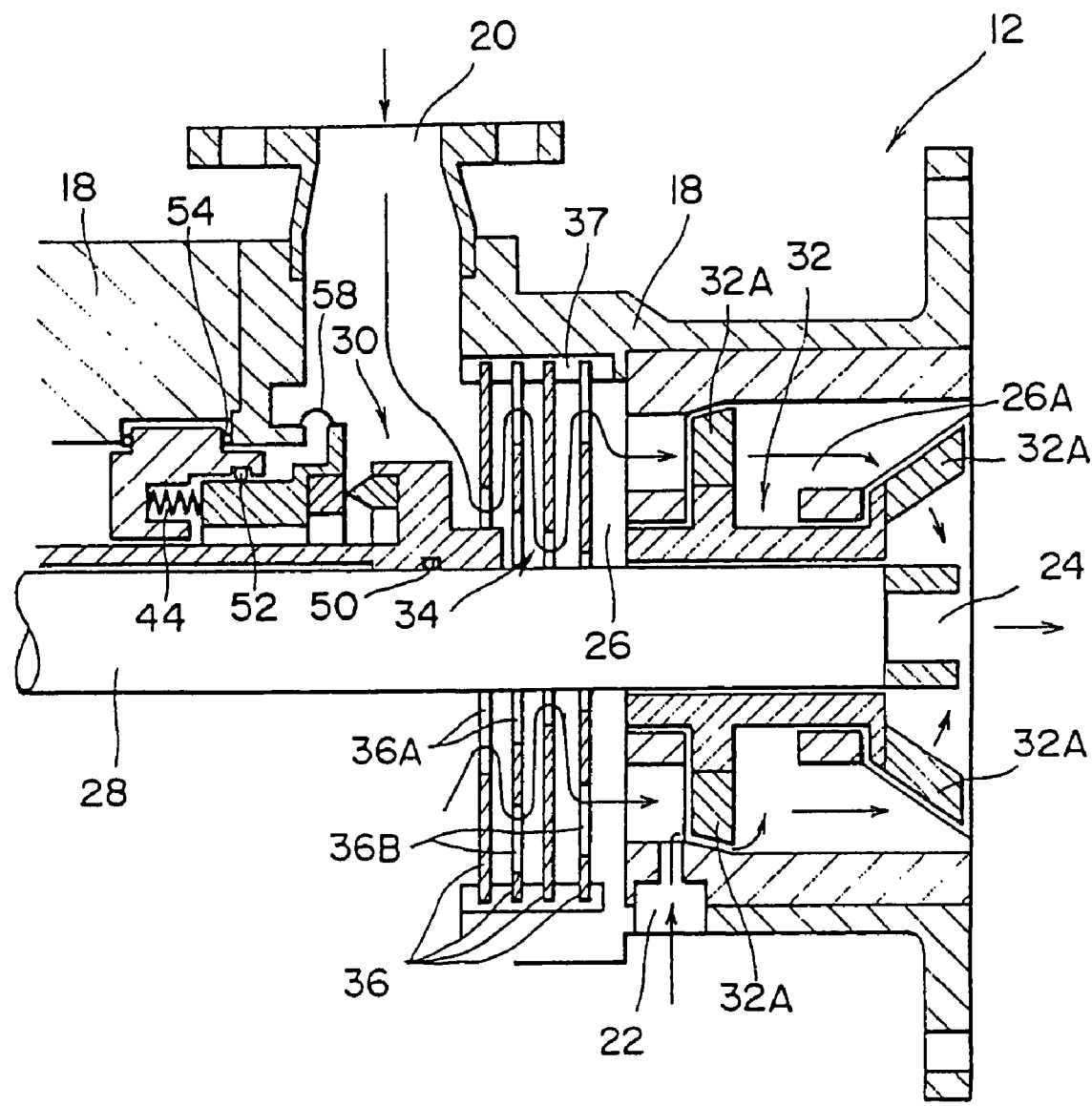
FIG. 2 is a cross sectional view of a main part showing internal structure of an in-line mixing apparatus according to the present invention.

FIG. 1 is an external view showing an in-line mixing apparatus 10 according to the present invention. FIG. 2 is a cross sectional view of an important part showing an internal structure of the in-line mixing apparatus 10.

As shown in FIG. 1, the in-line mixing apparatus 10 is constituted with a mixing apparatus main body 12, a shaft bearing 14 and a motor 16. Since the shaft bearing 14 and the motor 16 are not main portions of the present invention, descriptions thereof are omitted herein.

As shown in FIG. 2, in a casing 18 of the mixing apparatus main body 12, a mixing flow path 26 having a cylindrical form which communicates with two injection inlets 20 and 22 and one discharge outlet 24 is formed, and a rotation shaft 28 supported by the shaft bearing 14 (see FIG. 1) is disposed in the direction of a center line of the mixing flow path 26. A shaft sealing portion or mechanical seal 30 for sealing the rotation shaft 28 is provided in the mixing flow path 26 at the side of the shaft bearing 14, and the discharge outlet 24 is provided at the side opposite to the shaft sealing portion or mechanical seal 30. The two injection inlets 20 and 22 are separately disposed at an upstream side and a downstream side with respect to the shaft sealing portion or mechanical seal 30, and a chemical solution (hereinafter referred to as a process fluid) injected into the mixing flow path 26 from the injection inlet 20 at the upstream side (hereinafter referred to as "the upstream injection inlet 20") forms a flow in the mixing flow path 26 from the upstream injection inlet 20 toward the outlet 24. A rotary blade 32 is provided between a position in the vicinity of the injection inlet 22 at the downstream side (hereinafter referred to as "the downstream injection inlet 22") and the discharge outlet 24. The rotary blade 32 is supported by the rotation shaft 28 and has a plurality of agitation blades 32A. A mixing area 26A, in which the chemical solutions are mixed, is formed at the location of the rotary blade 32 in the mixing flow path 26 through high speed revolution of the rotary blade 32 with high speed revolution of the rotation shaft 28. As the rotary blade 32, for example, a propeller blade, a paddle blade or a turbine blade can be preferably used, but it is not particularly limited to these types and structures of these as long as the chemical solutions can be uniformly mixed.

A reverse flow preventing mechanism 34 is provided between the rotary blade 32 and the shaft sealing portion or mechanical seal 30 in the mixing flow path 26.

The reverse flow preventing mechanism 34 is constituted by disposing at least one annular-shaped weir plate 36 perpendicular to the rotation shaft 28. The weir plate 36 has a center hole 36A having a diameter larger than the rotation shaft 28, into which the rotation shaft 28 is inserted, and a periphery of the weir plate 36 is supported by a weir plate supporting member 37 fixed on an inner wall of the casing 18. Although the stationary weir plate 36 is shown in FIG. 2 as being supported by the casing 18, the invention is not limited thereto, and it is possible that the weir plate 36 is supported by the rotation shaft 28 such that the weir plate 36 is apart from the casing 18 at the side of the casing 18, to form a weir plate 36 which rotates with the rotation of rotation shaft 28. Furthermore, the stationary weir plate 36 and the rotary weir plate 36 can be used in combination.

An opening 36B may optionally be provided at the periphery of the weir plate 36 in order to avoid hindrance of the flow of the process fluid from the upstream side to the downstream side. It is preferred that the opening ratio of the weir plate 36 and the size of the weir plate 36 itself are appropriately determined by the viscosity and flow rate of the process fluid and the inner dimensions and shape of the mixing flow path 26. Particularly, in the case where the weir plates 36 are composed of a plurality of plates, it is preferred that the weir plates 36 having an opening 36B at the periphery of the plate 36 and the weir plates 36 having no opening 36B are arranged alternately. According to this configuration, a labyrinth flow path having a serpentine flow path as shown in FIG. 2 is formed, so that the flow resistance of the process fluid due to the weir plates 36 can be reduced, and a back flow of the chemical solution in the mixing area 26A to the shaft sealing portion or mechanical seal 30 can be effectively prevented. It is also preferred that length (radius) of the weir plates 36 becomes larger toward the downstream side of the mixing flow path 26. According to this configuration, back flow of the chemical solution in the mixing area 26A to the shaft sealing portion or mechanical seal 30 can be further effectively prevented. If the number of the weir plates 36 is too small, the back flow preventing function becomes insufficient, and if the number of the weir plates 36 is too large, flow of the process fluid toward the downstream side is hindered. Therefore, the number of the weir plates 36 is preferably from 2 to 10, and more preferably from 2 to 5.

Figure 3:
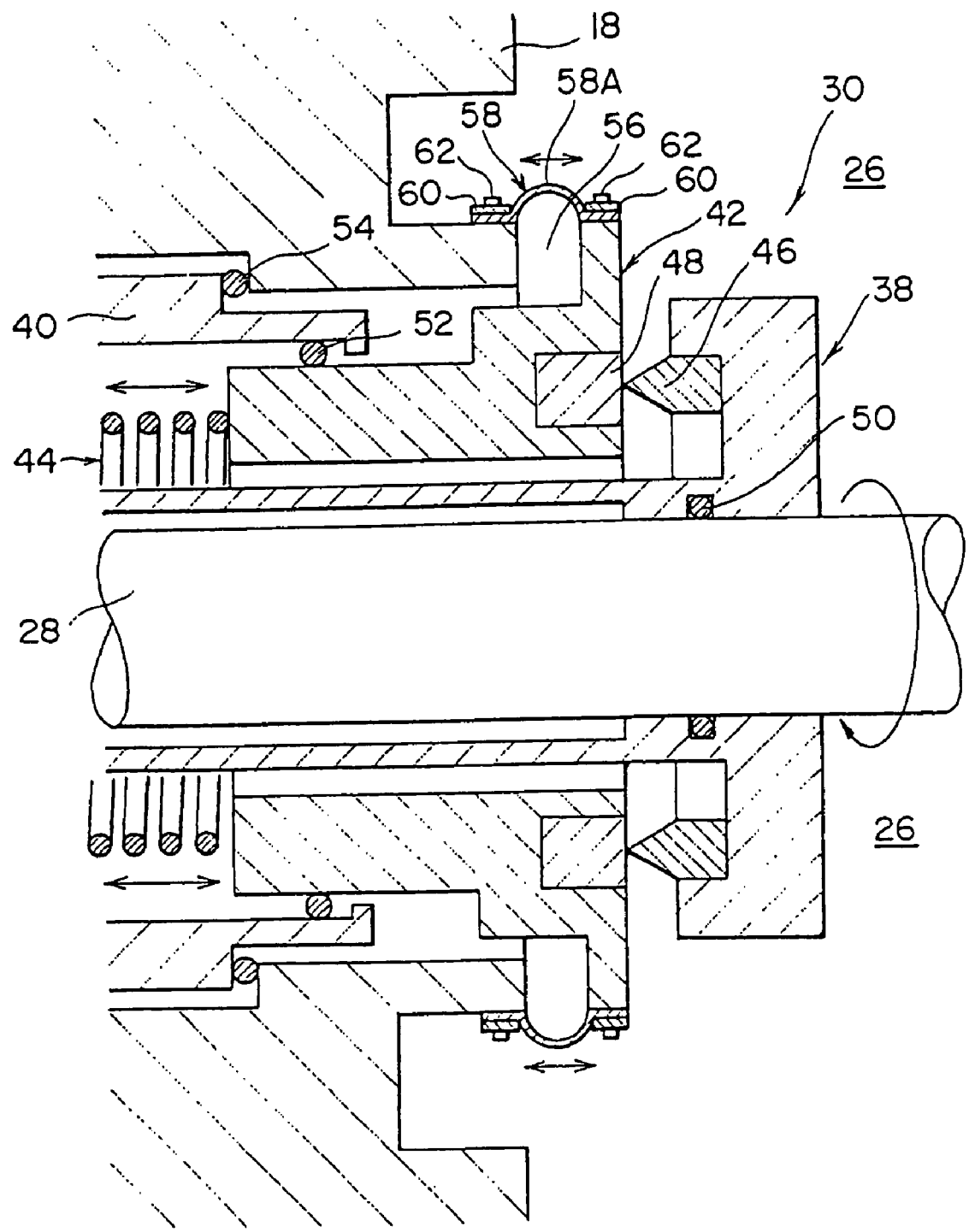
FIG. 3 is an enlarged cross sectional view of a main part showing a shaft sealing portion or a mechanical seal of an in-line mixing apparatus according to the present invention.

FIG. 3 is an enlarged cross sectional view of a main part showing the shaft sealing portion or mechanical seal 30. As the shaft sealing portion or mechanical seal 30, for example, a mechanical seal, a ground seal or the like can be used, and an embodiment using a mechanical seal is described herein.

As shown in FIG. 3, the mechanical seal 30 is mainly composed of a rotation ring member 38 supported by the rotation shaft 28 and rotating along with high speed rotation of the rotation shaft 28, a seal ring member 42 which is movable forward and backward and is supported by a supporting member 40 at the side of the casing 18 in a direction of the rotation ring member 38, and a pressing means 44 for urging the seal ring member 42 toward the rotation ring member 38. An acute ring 46 having an acute tip-shaped edge is provided on the rotation ring member 38 and brought into contact under pressure with a seal ring 48 having a flat end surface, which is provided on the seal ring member 42, by the pressing means 44. At this time, the seal ring 48 is pressed to the acute ring 46 with an appropriate pressure by the urging force of the pressing means 44. As the pressing means 44, a spring-type member and a bellows-type member can be preferably used, but it is not particularly limited as long as the seal ring 48 is constantly pressed to the acute ring 46 with an appropriate pressure. By using the mechanical seal 30 thus constituted in this manner, the liquid flowing in the mixing flow path 26 does not leak even when the rotation shaft 28 rotates at a high speed, and vibrations caused by high speed rotation of the rotation ring member 38 are absorbed by the pressing means 44.

In order to seal between the rotation shaft 28 and the rotation ring member 38, between the supporting member 40 and the seal ring member 42, and between the supporting member 40 and the casing 18, a first O-ring 50, a second O-ring 52 and a third O-ring 54 are provided, respectively.

Furthermore, a liquid contact preventing means is provided to prevent the pressing means 44, which is for pressing the rotation ring member 38 to the seal ring member 42 of the mechanical seal 30, from contacting the chemical solutions flowing in the mixing flow path 26. As the liquid contact preventing means, it is preferred to provide a cylindrical-shaped separating film 58 between the casing 18 and the seal ring member 42 so as to shield an opening facing the mixing flow path 26 of a gap 56 between the casing 18 and the seal ring member 42. The position where the separating film 58 is provided is not limited to the opening of the gap 56 but may be any position such that the chemical solutions flowing in the mixing flow path 26 cannot reach the pressing means 44. With respect to a method for mounting the separating film member 58 to the casing 18 and the seal ring member 42, a metal ring 60 is fitted onto the separating film member 58, and bolted to the metal ring 60 by bolts 62, or the separating film member 58 is fixed on the casing 18 and the seal ring member 42 with an adhesive (not shown in the figure). The method is not particularly limited, as long as the separating film member 58 can be securely mounted. In order to avoid hindrance of forward and backward movement of the seal ring member 42 for absorbing vibrations caused by high speed rotation of the rotation ring member 38, the separating film member 58 is preferably formed with a relatively soft and thin material, such as a rubber sheet or a fluorine resin sheet. The thickness of the separating film member 58 is preferably 5 mm or less, and more preferably 3 mm or less. Furthermore, it is also preferred that the width of the separating film member 58 is larger than the width of the gap 56, whereby a curved part 58A is provided at a central portion of the separating film member 58 to give a degree of leeway. According to this configuration, not only can the gap 56 facing the mixing flow path 26 between the casing 18 and the seal ring member 42 be sealed, but also the movement of the seal ring member 42 is not impeded owing to the expansion and contraction in the directions of arrows shown in FIG. 3.

The liquid contact preventing means is not limited to the separating film member 58, and any means can be employed as long as the pressing means 44 is physically shielded from the mixing flow path 26, and the movement of the seal ring member 42 is not impeded. For example, a member can be employed such that the length thereof can be adjusted by folding in the manner of an accordion.

Among the members constituting the in-line mixing apparatus 10, those parts that are in contact with the chemical solutions are preferably coated or lined with a fluorine resin which is excellent in water repellency and oil repellency. Cooling water or a coolant, such as ethylene glycol, may be supplied to the in-line mixing apparatus 10 for cooling the seal of the shaft.

Figure 4:
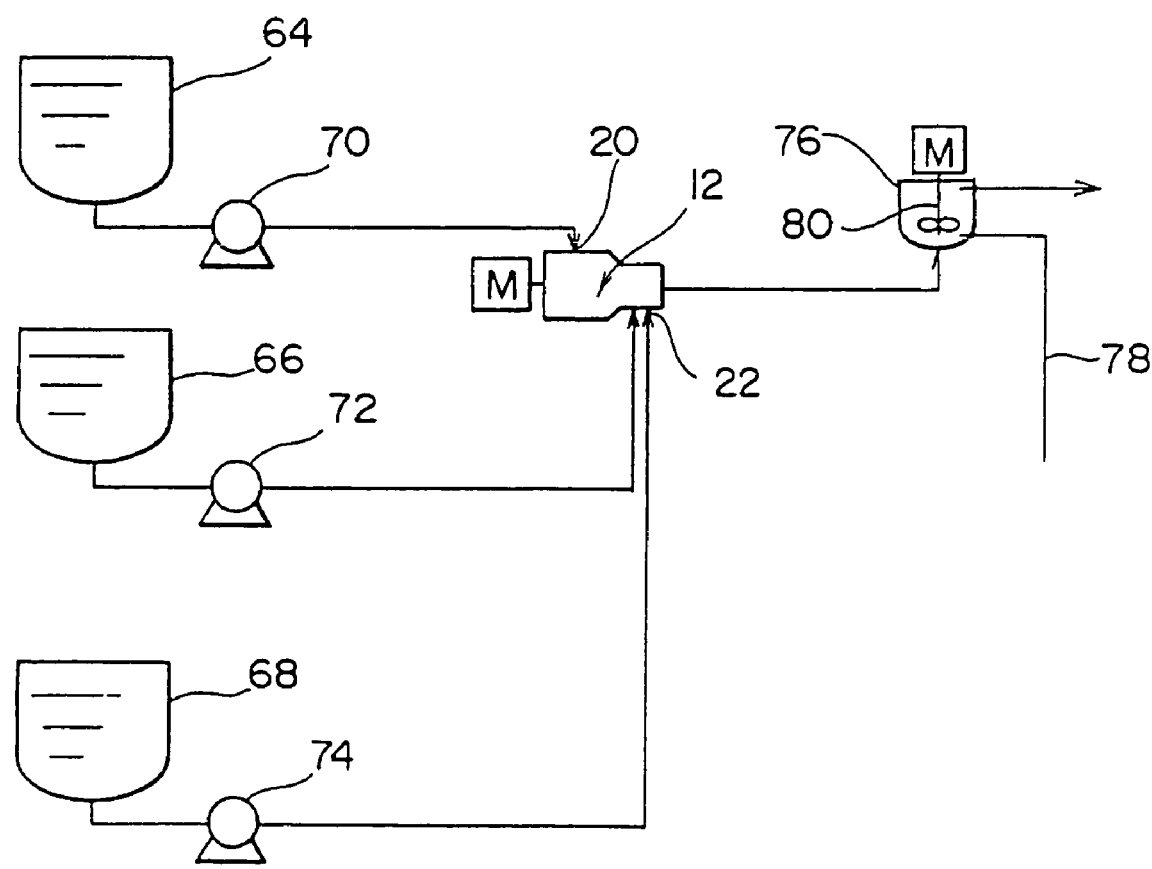
FIG. 4 is a diagram of an example where an in-line mixing apparatus according to the present invention is applied to a microcapsule production line, and shows flows of the microcapsule production line in the vicinity of the in-line mixing apparatus.

FIG. 4 is an example where the in-line mixing apparatus 10 configured as in the foregoing is applied to a production line of microcapsules to be used, for example, in pressure-sensitive paper, heat-sensitive paper, photographic photo-sensitive material, cosmetics or paint.

The process for producing microcapsules of the present invention includes: adding a polyvalent isocyanate and a polyol to an oil phase solution in which a solute that is to be a core substance of capsules has been dissolved in advance; mixing these in an in-line mixing apparatus to form a mixed chemical solution; emulsifying the mixed chemical solution thus obtained in a water phase solution containing an emulsifier to form an emulsion; and allowing a polyvalent amine to react with the emulsion to produce microcapsules at droplet interfaces. FIG. 4 shows flows of the microcapsule production line only in a vicinity of the in-line mixing apparatus 10.

As shown in FIG. 4, an oil phase solution, which is a process fluid in which a solute that is to be a core substance of capsules is dissolved in advance, is stored in a first storage tank 64, and a polyvalent isocyanate and a polyol are stored in second and third storage tanks 66 and 68, respectively. The oil phase solution, the polyvalent isocyanate and the polyol are stirred to be homogenized and adjusted to appropriate temperatures in the storage tanks 64, 66 and 68, respectively. It is preferred that spaces above the fluid levels in the storage tanks 64, 66 and 68 are sealed with an inactive gas, such as nitrogen, or with dry air, so as to prevent quality changes and concentration changes of the stored chemical solution. Furthermore, it is also preferred, for maintaining quality of the chemical solutions, to provide a system such that the chemical solutions are automatically resupplied when the amounts of the chemical solutions in the storage tanks 64, 66 and 68 are decreased.

Among the chemical solutions stored in the storage tanks 64, 66 and 68, the oil phase solution to serve as the process fluid is continuously injected from the upstream injection inlet 20 of the in-line mixing apparatus 10 by a first metering pump 70. The polyvalent isocyanate and the polyol are injected to the downstream injection inlet 22 of the in-line mixing apparatus 10 by second and third metering pumps 72 and 74, respectively. The metering pumps 70, 72 and 74 herein may be any pump that has an excellent performance with regard to a constant feeding rate of a liquid, such as a gear pump, a plunger pump or a diaphragm pump.

The oil phase solution injected from the upstream injection inlet 20 of the in-line mixing apparatus 10 is uniformly mixed with the polyvalent isocyanate and polyol injected from the downstream injection inlet 22 in the mixing area 26A by means of the rotary blade 32, and the mixed solution is discharged from the discharge outlet 24. In this mixing operation, the oil phase solution injected from the upstream injection inlet 20 forms a flow in the mixing flow path 26 from the upstream injection inlet 20 toward the discharge outlet 24. The rotary blade 32 is provided on the downstream side from the mechanical seal 30. Because of the positional relationship of the flow and the rotary blade, the polyvalent isocyanate and the polyol injected from the downstream injection inlet 22 are not likely to form a reverse flow toward the mechanical seal 30, even when turbulent flow occurs due to a rotational flow of the rotary blade 32. Furthermore, the reverse flow toward the mechanical seal 30 is further prevented by the plurality of the weir plates 36 arranged between the mechanical seal 30 and the rotary blade 32. Consequently, the polyvalent isocyanate and polyol injected from the downstream injection inlet 22 cannot flow back to reach the mechanical seal positioned at the upstream side. Therefore, a polyurea resin, which is a reaction product of the polyvalent isocyanate and the polyol, and a polyurethane resin, which is a reaction product of trace water contained in the oil phase solution and the polyvalent isocyanate, are unlikely to adhere to and grow on the mechanical seal 30, whereby deterioration of the sealing performance of the mechanical seal 30 can be avoided. Accordingly, induction of leakage of the liquid from the mechanical seal 30 can be effectively avoided.

Because the separating film member 58 for sealing the gap 56 facing the mixing flow path 26 between the casing 18 and the seal ring member 42 is provided in the mechanical seal 30, the polyvalent isocyanate and the polyol injected from the downstream inlet 22 and the oil phase solution injected from the upstream injection inlet 20 do not come into contact with the pressing means 44 of the mechanical seal 30. Therefore, the polyurea resin which is a reaction product of the polyvalent isocyanate and the polyol and the polyurethane resin which is a reaction product of trace water contained in the oil phase solution and the polyvalent isocyanate do not adhere to the pressing means 44. Consequently, the pressing means 44 responds well to vibration caused by high speed rotation of the rotation ring member 38 with high accuracy, and thus the pressing pressure of the seal ring member 42 to the rotation ring member 38 can be consistently maintained at an appropriate level. Consequently, leakage of the liquid due to a decrease in pressing pressure does not occur.

As shown in FIG. 4, the oil phase solution, the polyisocyanate and the polyol mixed in the in-line mixing apparatus 10 are transported to a continuous emulsifying tank 76. In the continuous emulsifying tank 76, a water phase solution is added from a water phase solution supply pipe 78 to the mixed chemical solution, and an oil-in-water emulsion is produced by an agitator 80. A polyvalent amine is allowed to react with the resulting emulsion to produce microcapsules at droplet interfaces.

In an embodiment of the invention, as the solute of the oil phase solution injected from the upstream injection inlet 20, various kinds of basic colorless dyes that are generally used in capsules for pressure-sensitive duplicating paper, as well as various kinds of recording materials, medicines, perfumes, agrichemicals, chemical products, adhesives, liquid crystals, paints, foods, cleansers, solvents, catalysts, enzymes and rust preventing agents can be used, in accordance with the applications of the objective capsules. Examples of the basic colorless dye include triarylmethane compounds, such as crystal violet lactone, 8,8-bis(p-dimethylaminophenyl)phthalide and 3-(p-dimethylaminophenyl)-3-(1,2-dimethylindol-3-yl)phthalide, diphenylmethane compounds, such as 4,4'-bisdimethylaminobenzhydryl benzyl ether, N-halophenyl leuco auramine and N-2,4,5-trichlorophenyl leuco auramine, xanthene compounds, such as rhodamine B-anilinolactam, 3-diethylamino-7-chlorofluoran, 3-diethyamino-6,8-dimethylfluoran, 8,7-dimethyaminofluoran and 3-diethylamino-7-chloroethylmethylaminofluoran, thiazine compounds, such as benzoyl leuco methylene blue and p-nitrobenzyl leuco methylene blue, and spiro compounds, such as 3-methyl-spiro-dinaphthopyran, 3-ethyl-spiro-dinaphthopyran and 3-propyl-spiro-dibenzopyran, and these may be used solely or in combination.

Examples of a solvent for dissolving the solute include animal oils, such as a fish oil and lard, vegetable oils, such as ricinus oil, soy bean oil and colza oil, mineral oils, such as kerosene and naphtha, and synthetic oils, such as alkylated naphthalene, alkylated biphenyl, hydrogenated terphenyl, alkylated diphenylmethane and alkylated benzene, and these may be used solely or in combination.

Examples of the polyvalent isocyanate injected from the downstream injection inlet 22 include diisocyanates, such as m-phenylenediisocyanate, p-phenylenediisocyanate, 2,6-tolylenediisocyanate, 2,4-tolylenediisocyanate, naphthalene-1,4-diisocyanate, diphenylmethane-4,4'-diisocyanate, 3,3'-dimethoxy-4,4'-biphenyldiisocyanate, 3,3'-dimethyldiphenylmethane-4,4'-diisocyanate, xylylene-1,4-diisocyanate, 4,4'-diphenylpropanediisocyanate, trimethylenediisocyanate, hexamethylenediisocyanate, propylene-1,2-diisocyanate, butylene-1,2-diisocyanate, ethylidynediisocyanate, cyclohexylene-1,2-diisocyanate and cyclohexylene-1,4-diisocyaante, triisocyanates, such as 4,4'4"-triphenylmethanetriisocyanate and toluene-2,4,6-triisocyanate, and 4,4'-dimethyldiphenylmethane-2,2',5,5'-tetraisocyanate. In the case where the polyvalent isocyanate is in a solid state, it is used after dissolving in at least one kind of a solvent, such as acetone, tetrahydrofuran, dimethylformamide, ethyl acetate, butyl acetate, dimethyl phthalate, dibutyl phthalate and dioctyl phthalate. The oily substances described in the foregoing may be added to the polyvalent isocyanate to be dissolved.

EXAMPLES

Example 1

An oil phase solution having 10 parts by weight of crystal violet lactone, 1 part by weight of benzoyl leuco methylene blue and 4 parts by weight of 3-(4-(diethylamino)-2-methoxy phenyl)-3-(2-methyl-1-ethyl-3-indolyl)-4-azaphthalide dissolved in this ratio therein as color formers was stored in a first storage tank at 65° C. As a polyvalent isocyanate, a biuret product of hexamethylenediisocyanate (Sumitomo N3200, produced by Sumitomo Bayer Urethane Co., Ltd.) was stored in a second storage tank at 30° C. As a polyol, HYBLOCKS ODX-1316A, produced by Dainippon Ink and Chemicals, Inc., was stored in a third storage tank at 30° C.

The oil phase solution, the polyisocyanate and the polyol were continuously supplied to an in-line mixing apparatus according to the present invention by using metering pumps at 47 parts by weight, 3 parts by weight and 1 part by weight, respectively, per minute.

In the in-line mixing apparatus used in Example 1, an upstream injection inlet with respect to the mechanical seal, from which the oil phase solution was injected, and a downstream injection inlet, from which the polyvalent isocyanate and the polyol were injected, were separately disposed to form a flow of the oil phase solution injected from the upstream injection inlet, from the upstream injection inlet to a discharge outlet in the mixing flow path, and a rotary blade was arranged between the vicinity of the downstream injection inlet and the discharge outlet.

Resultantly, leakage of the liquid occurred from a mechanical seal after supplying the liquids for 1,500 hours. It is considered in Example 1 that because the polyvalent isocyanate and the polyol were injected under the condition where a flow of the oil phase liquid was formed from the upstream injection inlet toward the discharge outlet in the mixing flow path, a reverse flow toward the mechanical seal was not apt to take place even when turbulent flow occurs due to rotational flow of the rotary blade, whereby a reaction product did not tend to adhere to and grow on the mechanical seal.

Comparative Example 1

In an in-line mixing apparatus of Comparative Example 1, both the injection inlet for the oil phase solution and the injection inlet for the polyisocyanate and the polyol were provided in the vicinity of the mixing area where the rotary blade was disposed, and no reverse flow preventing mechanism was provided. In other words, the chemical solutions to be mixed were directly injected into the mixing area without forming a flow from the upstream side of the mechanical seal to the discharge outlet in the mixing flow path. Resultantly, leakage of the liquid occurred from the mechanical seal after continuously supplying the liquids for 350 hours. It is considered in Comparative Example 1 that because no flow of the oil phase solution was formed from the upstream injection inlet to the discharge outlet in the mixing flow path, a back flow toward the mechanical seal was liable to occur due to turbulent flow caused by rotational flow of the rotary blade, whereby the reaction product was adhered to and grown on the mechanical seal in a short period of time.

Example 2

In an in-line mixing apparatus of Example 2, a reverse flow preventing mechanism constituted with weir plates was provided between the mechanical seal and the rotary blade of the in-line mixing apparatus of Example 1. The oil phase solution, the polyvalent isocyanate and the polyol, which were the same as those in Example 1, were continuously supplied to the in-line mixing apparatus thus constituted by using metering pumps in the same ratio as in Example 1.

Resultantly, no leakage of the liquid from the mechanical seal had occurred after continuously supplying the liquids for 1,800 hours. It is considered in Example 2 that because a flow of the oil phase liquid was formed from the upstream injection inlet to the discharge outlet in the mixing flow path, and the reverse flow preventing mechanism constituted with weir plates was provided between the mechanical seal and the rotary blade, a reverse flow toward the mechanical seal was even less likely to take place even when turbulent flow occurred due to rotational flow of the rotary blade.

Example 3

In Example 3, the same chemical solutions as in Example 1 were continuously supplied to the same in-line mixing apparatus as in Example 1 in a ratio that was different from that in Example 1. The ratio of the chemical solutions was 50 parts by weight, 3 parts by weight and 1 part by weight of the oil phase solution, the polyvalent isocyanate and the polyol, respectively. Resultantly, leakage of the liquid from the mechanical seal occurred after supplying the liquids for 1,500 hours.

Example 4

In an in-line mixing apparatus of Example 4, a separating film member for shielding a gap facing the mixing flow path between a casing and a seal ring member was provided, but no weir plate for a reverse flow preventing mechanism was provided.

Resultantly, no adhesion of a reaction product onto a pressing means had been observed after continuously supplying the liquids for 1,500 hours, and the pressing means followed vibrations caused by high speed rotation of a rotation ring member with high accuracy. No leakage of the liquid from the mechanical seal was observed.

Example 5

In an in-line mixing apparatus of Example 5, a reverse flow preventing mechanism constituted by four weir plates was further provided in the in-line mixing apparatus of Example 4. Other conditions were the same as in Example 4.

Resultantly, adhesion of a reaction product onto the pressing means, and adhesion and growth of a reaction product to mechanical seal parts other than the pressing means had not occurred after continuously supplying the liquids for 1,800 hours. Thus, no leakage of the liquid from the mechanical seal was observed.

Comparative Example 2

In an in-line mixing apparatus of Comparative Example 2, the separating film member was removed from the in-line mixing apparatus of Example 4. Other conditions were the same as in Example 4.

Resultantly, adhesion of a reaction product to the pressing means was observed after continuously supplying the liquids for 350 hours, and the accuracy of conformance of the pressing means to vibrations caused by high speed rotation of the rotation ring member was decreased after supplying the liquids for 500 hours.

Comparative Example 3

In Comparative Example 3, the same chemical solutions as in Comparative Example 2 were supplied to the same in-line mixing apparatus as in Comparative Example 2 in a ratio that was different from that in Comparative Example 2. The ratio of the chemical solutions was 50 parts by weight, 3 parts by weight and 1 part by weight of the oil phase solution, the polyvalent isocyanate and the polyol, respectively. Resultantly, the accuracy of conformance of the pressing means to vibrations caused by high speed rotation of the rotation ring member was decreased after supplying the liquids for 500 hours.

As described in the foregoing, the in-line mixing apparatus and the process for mixing reactive chemical solutions of the present invention can provide an in-line mixing apparatus and a process for mixing reactive chemical solutions that are capable of carrying out stable continuous mixing over a long period of time even when chemical solutions having reactivity are mixed. Therefore, the in-line mixing apparatus of the invention is particularly effective for production of microcapsules used, for example, in pressure-sensitive paper, heat-sensitive paper, photographic photosensitive material, cosmetics, paint, and the like.

What is claimed is:

1. An in-line mixing apparatus for mixing a plurality of chemical solutions, the apparatus comprising:
   a mixing apparatus main body, including a plurality of injection inlets and at least one discharge outlet, the plurality of chemical solutions being injected at the injection inlets, the plurality of injection inlets including an upstream injection inlet and at least one downstream injection inlet which are separately disposed;
   a mixing flow path formed inside the mixing apparatus main body, which communicates with the plurality of injection inlets and the discharge outlet;
   a rotary blade disposed in the mixing flow path between a vicinity of the downstream injection inlet and the discharge outlet for mixing the plurality of chemical solutions injected at the injection inlets, the rotary blade including a rotation shaft; and
   at least one of a shaft sealing portion and a mechanical seal disposed at the rotation shaft of the rotary blade for sealing the rotation shaft, the at least one of a shaft sealing portion and a mechanical seal being disposed at a downstream side of the upstream injection inlet and being disposed at an upstream side of the downstream injection inlet,
   wherein a chemical solution injected at the upstream injection inlet forms a flow along the mixing flow path from the upstream injection inlet to the discharge outlet, and
   wherein the at least one of a shaft sealing portion and a mechanical seal comprises: a rotation ring member; a seal ring member; and pressing means for urging the seal ring member toward the rotation ring member, and
   the apparatus further comprises liquid contact preventing means for substantially preventing the chemical solutions in the mixing flow path from coming into contact with the pressing means.

2. The in-line mixing apparatus of claim 1, further comprising a reverse flow preventing mechanism disposed in the mixing flow path between the at least one of a shaft sealing portion and a mechanical seal and the rotary blade.

3. The in-line mixing apparatus of claim 2, wherein the reverse flow preventing mechanism comprises a weir plate disposed to reduce cross-sectional area of the mixing flow path.

4. The in-line mixing apparatus of claim 3, wherein the reverse flow preventing mechanism comprises a plurality of the weir plates, wherein the length of the weir plates becomes larger toward the downstream side of the mixing flow path.

5. The in-line mixing apparatus of claim 4, wherein the number of the weir plates is from 2 to 10.

6. An in-line mixing apparatus for mixing a plurality of chemical solutions, the apparatus comprising:
   a mixing apparatus main body, including at least one injection inlet, the plurality of chemical solutions being injected at the at least one injection inlet;
   a mixing flow path formed inside the mixing apparatus main body;
   a rotary blade disposed in the mixing flow path for mixing the plurality of chemical solutions injected at the at least one injection inlet, the rotary blade including a rotation shaft;
   a mechanical seal disposed at the rotation shaft of the rotary blade for sealing the rotation shaft, the mechanical seal including a rotation ring member, a seal ring member, and pressing means for urging the seal ring member toward the rotation ring member; and
   liquid contact preventing means for substantially preventing the chemical solutions in the mixing flow path from coming into contact with the pressing means.

7. The in-line mixing apparatus of claim 6, wherein a gap, which communicates with the pressing means, is formed between a casing and the seal ring member, and the liquid contact preventing means includes a separating film member which faces the mixing flow path and separates the gap from the mixing flow path so as to prevent the chemical solutions flowing in the mixing flow path from coming into contact with the pressing means.

* * * * *